(12) United States Patent
Campbell et al.

(10) Patent No.: US 8,415,427 B2
(45) Date of Patent: Apr. 9, 2013

(54) WATER IMPERVIOUS, REMOVABLE CAULK AND SEALANT COMPOSITION

(75) Inventors: G. Blair Campbell, St. Petersburg, FL (US); Nick Conley, Redwood City, CA (US)

(73) Assignee: Floodfoam, Inc., St. Petersburg, FL (US)

( * ) Notice: Subject to any disclaimer, the term of this patent is extended or adjusted under 35 U.S.C. 154(b) by 244 days.

(21) Appl. No.: 12/638,449

(22) Filed: Dec. 15, 2009

(65) Prior Publication Data
US 2011/0144247 A1    Jun. 16, 2011

(51) Int. Cl.
*C08C 9/02* (2006.01)
*C08L 53/02* (2006.01)

(52) U.S. Cl. .......... 524/572; 524/81; 524/366; 524/474; 524/476; 524/490; 524/491; 524/575

(58) Field of Classification Search ............ 524/81, 524/366, 474, 476, 490, 491, 572, 575
See application file for complete search history.

(56) References Cited

U.S. PATENT DOCUMENTS

| 2,348,447 | A | * | 5/1944 | Bock | 524/364 |
|---|---|---|---|---|---|
| 3,267,063 | A | | 8/1966 | Hudson | |
| 4,764,535 | A | | 8/1988 | Leicht | |
| 5,925,706 | A | | 7/1999 | Roberts | |
| 6,284,077 | B1 | | 9/2001 | Lucas | |
| 6,291,536 | B1 | | 9/2001 | Taylor | |
| 6,333,365 | B1 | | 12/2001 | Lucas | |
| 6,395,794 | B2 | | 5/2002 | Lucas | |
| 6,414,044 | B2 | * | 7/2002 | Taylor | 521/65 |
| 6,528,122 | B2 | | 3/2003 | Cordova | |
| 2002/0013402 | A1 | | 1/2002 | Fisher | |
| 2005/0154121 | A1 | * | 7/2005 | Fan et al. | 524/556 |
| 2008/0057317 | A1 | | 3/2008 | Kettner | |

FOREIGN PATENT DOCUMENTS
JP    07-070531 A    3/1995

* cited by examiner

*Primary Examiner* — Richard A Huhn
(74) *Attorney, Agent, or Firm* — Larson & Larson, P.A.; Frank Liebenow; Justin P. Miller

(57) ABSTRACT

A stable caulk or sealant composition containing as principal ingredients styrene-ethylene/butylene-styrene copolymer and Diethyl ether is disclosed. The composition is generally employed in a canister pressurized with a propellant to expel a stream of water-impervious sealant to fill cracks, crevices and gaps to water damage. When desired, the sealant is removable from the application area.

20 Claims, 3 Drawing Sheets

WATER IMPERVIOUS, REMOVABLE CAULK AND SEALANT COMPOSITION

FIELD

A sealant composition is described for use in preventing the intrusion of water. More specifically, a removable water sealant composition of Diethyl ether, Petroleum ether and styrene-ethylene/butylene-styrene Copolymers is described.

BACKGROUND

Polymeric materials have been used as sealants to fill in cracks, crevices or gaps in various useful structures. These polymeric materials prevent water, dirt or other contaminants from passing through such cracks, crevices or gaps. Such prior art sealants, after a period of time, allow water to enter the structure that is to be protected. Furthermore, prior sealants bond to structural materials such as metal and wood, making them less usable where non-permanent solutions are required. For example, using the prior sealants to fill around a door or window upon notice of a possible flood will help reduce water seepage, but after the flood subsides, such sealants are very difficult to remove from the doors, windows, etc.

There is a continuing need for a long lasting sealant that will continue to seal cracks, crevices or gaps in structures from water intrusion that is removable.

SUMMARY

The composition of this invention provides a novel group of components including a styrene-ethylene/butylene-styrene copolymer, a solvent such as Diethyl ether, a curing agent such as Petroleum ether (Ligroine) and optionally a propellant such as propane or isobutene or a combination of 50% hydrocarbon, 50% dimethyl ether.

In one embodiment, the sealant includes styrene-ethylene/butylene-styrene, Petroleum ether (Ligroine), and Diethyl ether that when added to a canister and filled with a propellant provides a water-impervious sealant that is sprayed or injected into cracks, crevices or gaps in structured members. The resultant water-impervious layer provides long term resistance to water intrusion into the structural members, such as cable boxes, telephone boxes, electrical boxes and marine products.

In another embodiment, a water-impervious sealant composition includes about 17 to 28.4 percent by weight styrene-ethylene/butylene-styrene copolymer, about 65.1 to 76.5 percent by weight of one or more solvents, and from 2 to about 12 percent by weight, preferably 6.5 percent by weight, of a higher boiling point solvent such as Petroleum ether.

In another embodiment, a water-impervious sealant composition includes 22.7% styrene-ethylene/butylene-styrene copolymer, 70.8% Diethyl ether and 6.5% Petroleum ether (Ligroine).

In another embodiment, a method of making a water-impervious sealant includes adding 17 to 28.4 percent by weight styrene-ethylene/butylene-styrene copolymer, 65.1 to 76.5 percent by weight diethyl ether and from 2 to about 12 percent by weight, preferably 6.5 percent by weight, of a higher boiling point solvent such as Petroleum ether into a canister forming the sealant, charging the canister with a propellant and sealing the canister.

BRIEF DESCRIPTION OF THE DRAWINGS

The composition can be best understood by those having ordinary skill in the art by reference to the following detailed description when considered in conjunction with the accompanying drawings in which.

DETAILED DESCRIPTION

Figure 1:
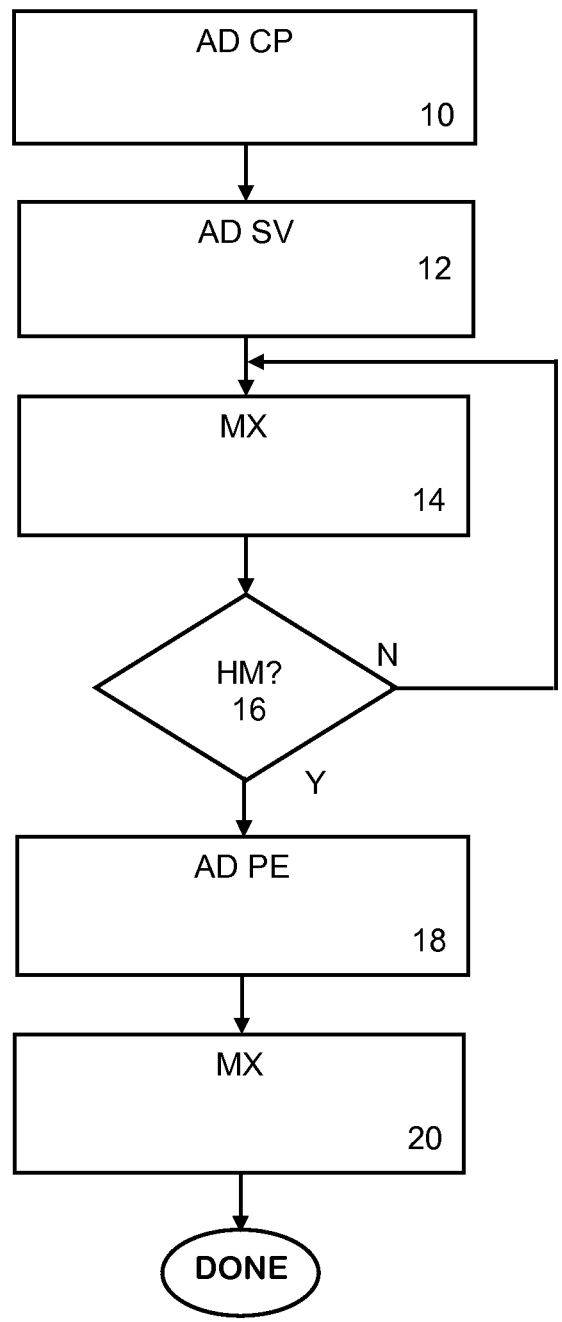
FIG. 1 is a flow chart of mixing the ingredients.

Throughout the following detailed description, the same reference numerals refer to the same elements in all figures.

In one embodiment, the composition employed is comprised of the following compounds by weight percent:

| | |
|---|---|
| Styrene-ethylene/butylene-styrene copolymer | 22.7% |
| Solvent (e.g. Diethyl ether) | 70.8% |
| HB Solvent (e.g. Petroleum ether) | 6.5% |

In a second embodiment, the composition employed in this composition is comprised of the following compounds by weight percent:

| | |
|---|---|
| Styrene-ethylene/butylene-styrene copolymer | 17% |
| Solvent (e.g. Diethyl ether) | 76.5% |
| HB Solvent (e.g. Petroleum ether) | 6.5% |

In a third embodiment, the composition employed is comprised of the following compounds by weight percent:

| | |
|---|---|
| Styrene-ethylene/butylene-styrene copolymer | 28.4% |
| Solvent (e.g. Diethyl ether) | 65.1% |
| HB Solvent (e.g. Petroleum ether) | 6.5% |

In a fourth embodiment, the composition is comprised of the following compounds by weight percent:

| | |
|---|---|
| Styrene-ethylene/butylene-styrene copolymer | 17%-28.4% |
| Solvent (e.g. Diethyl ether) | 76.5%-65.1% |
| HB Solvent (e.g. Petroleum ether) | 2%-12%% |

Although many compositions of copolymer are known comprising styrene and rubber, a blend of 13% styrene and 87% rubber as provided, for example, in a product called Kraton G1657 is preferred, though not required.

The preferred solvent is Diethyl ether, although it is anticipated that the solvent is any known solvent such as tetrahydrofuran, hexanes, petroleum ether, and D-limonene.

The preferred HB (higher boiling point) solvent is Petroleum ether, although it is anticipated that the HB solvent is any known higher boiling point solvent.

Although, in some embodiments, a foaming additive is anticipated such as pluracol GP 730 polyol, pluracol GP 1010 polyol, lupranate M20 isocyanate, UP-1005 Ultra Pure fluid mixture, and triethylamine, no foaming additive is required for pressurized dispensing because the propellant provides for the foaming action (e.g. combination of approximately 50% hydrocarbon, 50% dimethyl ether). In some embodiments, to enhance foaming action, Polyurethane prepolymer, and optionally, an emulsifier are added to the above mixture.

For pressurized canisters, it is preferred that the canister be filled with from 70 percent to 95 percent of the composition described above and from 5-30% of the propellent (e.g. 50% hydrocarbon, 50% dimethyl ether mixture).

For embodiments that are provided in a tube, such as a caulking tube, no propellant is required.

Referring to FIG. 1, the composition is prepared by adding the styrene-ethylene/butylene-styrene copolymer 10 and adding the solvent (Diethyl ether) 12 into a mixer and mixing 14. If the mixture isn't clear 16 and isn't homogeneous, repeat the mixing 14 until the mixture becomes clear and homogeneous. When the mixture is clear and homogenous 16, the higher boiling point solvent (e.g. Petroleum ether) is added 18 and mixed 20 until the composition is homogenous.

Some embodiments are provided in a tube while other embodiments are provided in a dispenser or canister. For embodiments that are provided in a tube, such as a caulking tube, no propellant is required.

Figure 2:
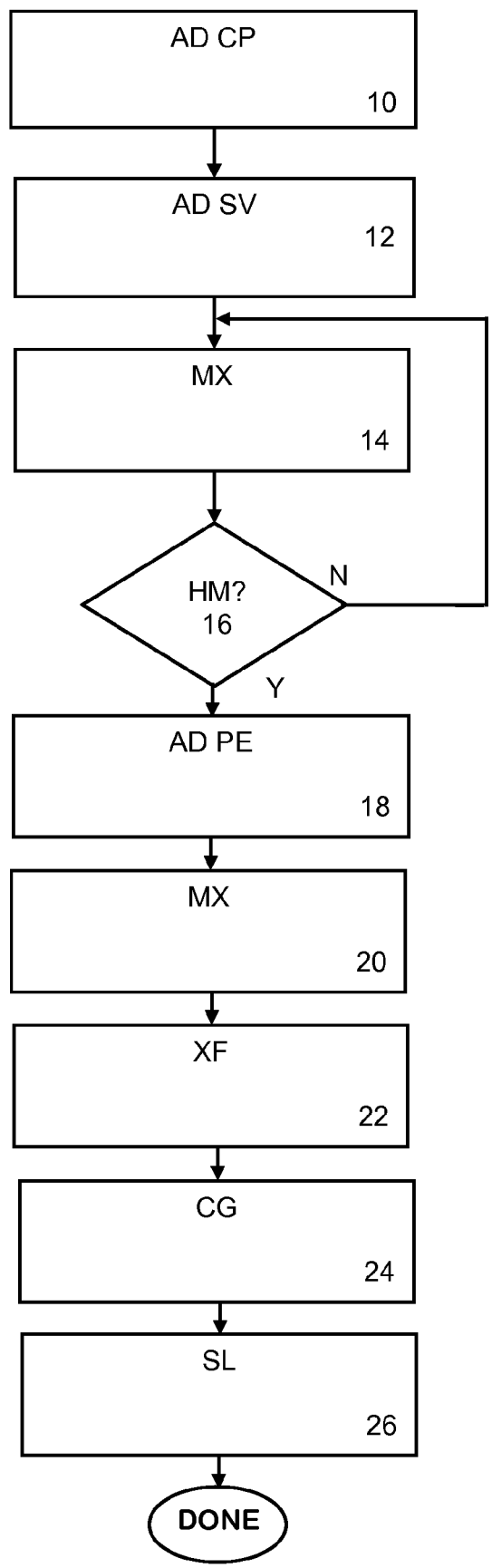
FIG. 2 is a flow chart of mixing the ingredients.

Referring to FIG. 2, for embodiments that are dispenser-based, the composition is prepared by adding the styrene-ethylene/butylene-styrene copolymer 10 and adding the solvent (Diethyl ether) 12 into a mixer and mixing 14. If the mixture isn't clear 16 and isn't homogeneous, repeat the mixing 14 until the mixture becomes clear and homogeneous. When the mixture is clear and homogenous 16, the higher boiling point solvent (e.g. Petroleum ether) is added 18 and mixed 20 until the composition is homogenous. The composition is then transferred to a canister 22 and charged 24 with a suitable amount of the propellant, such as propane, n-butane, isobutene or dimethyl ether and then sealed 26. The seal is provided with a means to selectively release the contents (nozzle/valve). Upon operation of the means to selectively release, pressure in the dispenser/canister expels a strand of the composition onto/into a target crack, crevice, gap, etc and the composition expands to fill the target crack, crevice, gap, etc. The propellant is added in an amount proportional to the canister/valve construction and desired flow rate. Although any ratio of the composition to propellant is anticipated, about 2-20 weight percent based on the total composition weight is preferred for most canister/valve systems.

Figure 3:
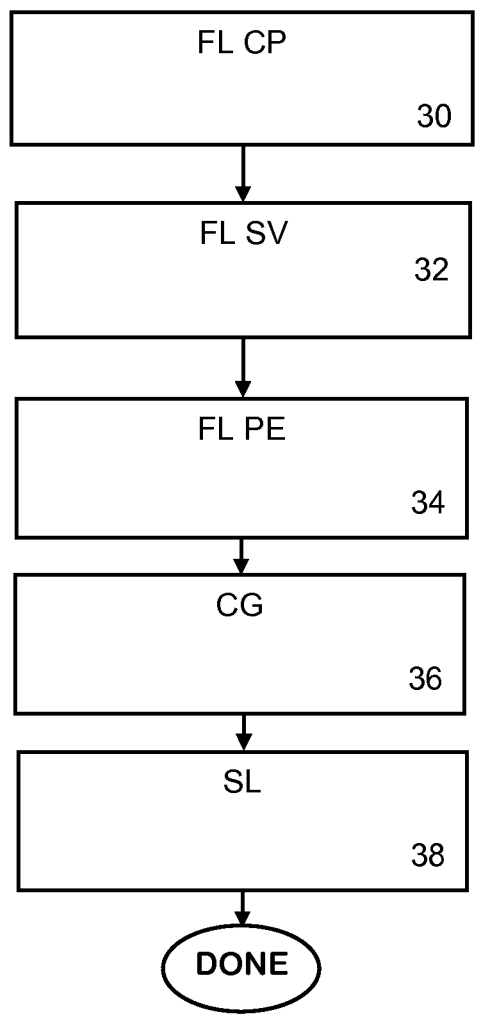
FIG. 3 is a second flow chart of mixing the ingredients.

Referring to FIG. 3, for embodiments that are dispenser-based, another way to prepare the composition is by filling the canister with the specified amount of the styrene-ethylene/butylene-styrene copolymer 30 and adding the specified amount of the solvent (Diethyl ether) 32 into the canister, and adding the specified amount of the higher boiling point solvent 34 (e.g. Petroleum ether) into the canister. It is preferred that the canister be filled to from 70% up to 95% with the above ingredients, leaving from 5% to 30% for the propellant. The canister is then charged 36 with a suitable amount of the propellant, such as propane, n-butane, isobutene or dimethyl ether, a mix of hydrocarbon and dimethyl ether up to its total fill volume (the recommended level to which the canister is specified to be filled); and then sealed 28. The seal is provided with a means to selectively release the contents (nozzle/valve). Upon operation of the means to selectively release, pressure in the dispenser/canister expels a strand of the composition onto/into a target crack, crevice, gap, etc and the composition expands to fill the target crack, crevice, gap, etc. The propellant is added in an amount proportional to the canister/valve construction and desired flow rate. Although any ratio of the composition to propellant is anticipated, about 2-20 weight percent based on the total composition weight is preferred for most canister/valve systems.

In some embodiments, the means for selectively releasing is a top valve to selectively open the container and allow expulsion of the pressurized composition and close the canister after the desired amount of the composition has been applied.

For embodiments that are that are provided in a tube, the composition is transferred to a tube and a strand of the composition is expelled upon pressure from an external source such as squeezing of the tube by hand or from pulling the trigger of a caulking gun.

The composition has many uses such as a temporary flood barrier for doors and low level windows. It is useful to removably seal gaps in cable boxes, electrical boxes, telephone boxes, and close gaps around protective ply-board for windows and doors during a hurricane or other flood danger. It is useful as a sealant in a myriad of marine and plumbing environments. A typical composition contains Styrene-ethylene/butylene-styrene copolymer at 17-28.4 weight percent, Diethyl ether at 76.5-65.1 weight percent and higher boiling point solvent (e.g. Petroleum ether) at 2-12 weight percent.

EXAMPLE 1

70.8 weight percent Diethyl ether is mixed with 22.7 weight percent styrene-ethylene/butylene-styrene copolymer until the mixture is clear and homogenous. The mixture is poured into a canister and 6.5 weight percent of higher boiling point solvent (e.g. Petroleum ether) is added to the mixture. The canister is then charged with 50% hydrocarbon, 50% dimethyl ether.

A valve on the canister is depressed to express a stream of the resulting sealer for filing a gap around doors or windows. After the danger of flood resides, the dried sealer is removable from the doors or windows.

The composition has been described with respect to a particular embodiment. Numerous equivalents of this composition will be obvious to those skilled in the art. The following claims generally should be construed to cover all such equivalents which are within the true spirit and scope of the composition.

What is claimed is:

1. A water-impervious, non-permanent sealant composition comprising: about 17 to 28.4 percent by weight styrene-ethylene/butylene-styrene copolymer, about 65.1 to 76.5 percent by weight of one or more solvents, and 2 to 12 percent by weight of a higher boiling point solvent;
   whereas after application of the water-impervious, non-permanent sealant to a surface and after curing of the sealant, the water-impervious, non-permanent sealant is removable.

2. The water-impervious sealant composition according to claim 1, wherein the one or more solvents are selected from the group consisting of tetrahydrofuran, hexanes, diethyl ether, and D-limonene.

3. The water-impervious sealant composition according to claim 1, wherein the higher boiling point solvent is petroleum ether.

4. The water-impervious sealant composition according to claim 1, wherein the one or more solvent is Diethyl ether.

5. The water-impervious sealant composition according to claim 1, wherein the sealant is provided in a canister, the canister having a valve for selectively releasing the water-impervious sealant from the canister, a propellant is added to the water-impervious sealant within the canister, the propellant is selected from the group consisting of propane, n-butane, isobutane and dimethyl ether.

6. The water-impervious sealant composition according to claim 4, wherein the propellant is approximately 50% hydrocarbon, 50% dimethyl ether.

7. The water-impervious sealant composition according to claim 5, wherein the propellant is selected from the group consisting of propane and isobutane.

8. The water-impervious sealant composition according to claim 1, wherein the composition is provided in a tube.

9. A water-impervious, non-permanent sealant composition comprising at a weight percent about:
- 22.7% by weight styrene-ethylene/butylene-styrene copolymer;
- 70.8% by weight of a solvent; and
- 6.5% by weight of a higher boiling point solvent;
whereas after application of the water-impervious, non-permanent sealant to a surface and after curing of the sealant, the water-impervious, non-permanent sealant is removable.

10. The water-impervious sealant composition according to claim 9, in a canister containing a propellant.

11. The water-impervious sealant composition according to claim 10, wherein the propellant is approximately 50% hydrocarbon, 50% dimethyl ether.

12. The water-impervious sealant composition according to claim 10, wherein the propellant is propane.

13. The water-impervious sealant composition according to claim 10, wherein the propellant is isobutane.

14. The water-impervious sealant composition according to claim 9, wherein the solvent is Diethyl ether.

15. The water-impervious sealant composition according to claim 9, wherein the higher boiling point solvent is Petroleum ether.

16. A method of making a water-impervious, non-permanent sealant comprising:
- placing 17 to 28.4 percent by weight styrene-ethylene/butylene-styrene copolymer into a canister;
- adding 65.1 to 76.5 percent by weight of a first solvent into the canister;
- adding 2 to 12 percent by weight of a higher boiling point solvent to the canister;
- the above ingredients filling the canister from 70 percent full up to as high as 95 percent full by volume;
- adding a propellant to the canister, the propellant comprising 5 percent to 30 percent of the volume of the total fill volume of the canister; and
- sealing the canister with a means to selectively release the sealant;
- whereas after application of the water-impervious, non-permanent sealant to a surface and after curing of the sealant, the water-impervious, non-permanent sealant is removable.

17. The method according to claim 16, wherein the propellant is approximately 50% hydrocarbon, 50% dimethyl ether.

18. The method according to claim 16, wherein the propellant is selected from the group consisting of propane, dimethyl ether and isobutane.

19. The method according to claim 16, wherein the first solvent is selected from the group consisting of tetrahydrofuran, hexanes, diethyl ether, and D-limonene.

20. The method according to claim 16, wherein the higher boiling point solvent is petroleum ether.

* * * * *